Aug. 2, 1960   J. J. LAREW   2,947,876
PINHOLE DETECTING UNIT
Filed Dec. 30, 1955   2 Sheets-Sheet 1
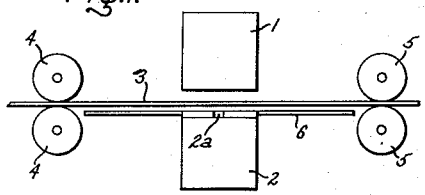
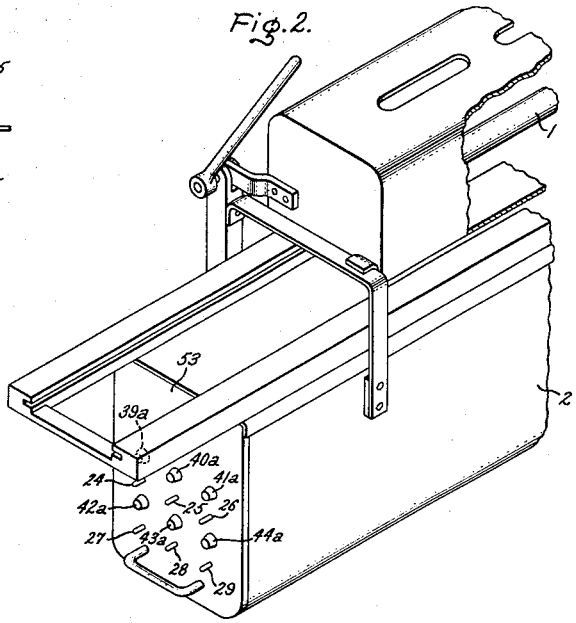
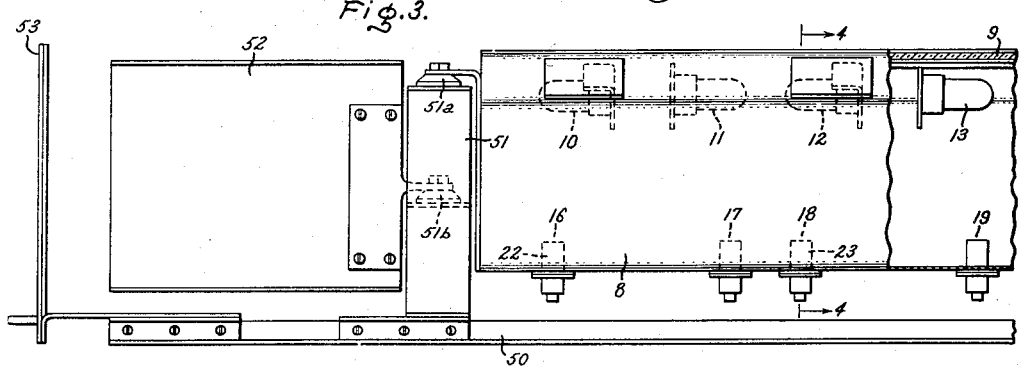
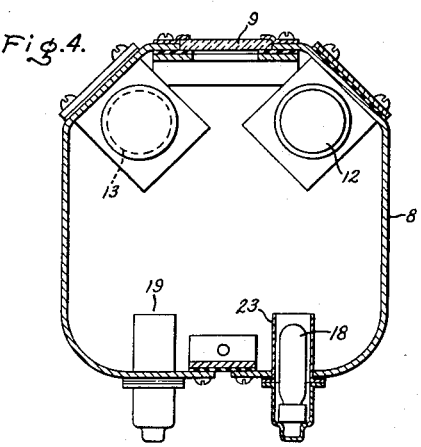
Inventor:
John J. Larew,
by Irving H. Marshman
His Attorney.

Aug. 2, 1960

J. J. LAREW 2,947,876

PINHOLE DETECTING UNIT

Filed Dec. 30, 1955

2 Sheets-Sheet 2

Fig.5.

Inventor:
John J. Larew,
by Irving H. Marshman
His Attorney.

United States Patent Office 2,947,876
Patented Aug. 2, 1960

2,947,876

PINHOLE DETECTING UNIT

John J. Larew, Waynesboro, Va., assignor to General Electric Company, a corporation of New York Filed Dec. 30, 1955, Ser. No. 556,652

9 Claims. (Cl. 250—219)

This invention relates to detecting units, more particularly, to detecting units in which light-sensitive devices are used for detecting pinholes in a length of flat material such as a sheet or a continuous length of metal or paper, and it has for an object the provision of a simple, reliable and improved detecting unit of this character. Still more specifically, the invention relates to pinhole detectors in which a plurality of light-sensitive units are provided for detecting the presence of pinholes in response to light transmitted from a source through such pinholes. Heretofore, pinhole detectors have been known in which a large number of light-sensitive devices were required, e.g. thirty for scanning material having 48″ width, and accordingly a more specific object of the invention is a very substantial reduction in the number of light-sensitive devices required for scanning a predetermined width of material.

One form of light-sensitive device which provides satisfactory results in pinhole detector applications is the well-known 931A photomultiplier tube. The gain in commercially available 931A photo tubes varies 60:1 from one tube to another in a lot. Consequently, previous detectors employing 931A tubes might have as much as 60:1 variation in gain over the width of the material undergoing inspection. In such detectors, if the sensitivity was, at least, equal to that required to detect a 1 mil hole at any point in the material, there might be areas in which the sensitivity of the detector was sufficient to detect ⅛ mil holes. This is undesirable because stray light may cause an abnormally high stray light signal to be produced by those tubes having the higher sensitivities thereby lowering the overall signal to electrical "noise" ratio. Counteracting this disadvantage by selecting tubes of matching gain characteristics is difficult and expensive. Another specific object of the invention, therefore, is the provision in a detector unit of means for rapidly and easily equalizing the gain of the light-sensitive devices, thereby to eliminate the necessity of selecting for use by test from a large number of tubes those with closely matching gain characteristics.

Another object of the invention is the provision in a detector unit of means for quickly determining the operative condition of each of the light sensitive devices in the detector.

In prior known pinhole detectors, the large number of light-sensitive devices resulted in a capacitance between light-sensitive devices that was of such magnitude as to require a load circuit of reasonably high value which placed a definite maximum speed of the inspected material at which a pinhole could be detected. Accordingly, a further object of this invention is to effect a substantial increase in such maximum operating speed.

In carrying the invention into effect in one form thereof, an elongated tubular housing member is provided with a longitudinal slot which is generally parallel to the longitudinal axis of the housing member for the purpose of admitting to the interior thereof light transmitted from a source through a pinhole in the material undergoing inspection. The interior surface of the housing member is coated with a highly reflective material to provide a light integrating chamber. A plurality of light-sensitive devices are mounted within the integrating chamber in proximity to the longitudinal slot and are spaced apart longitudinally to provide substantial intervals between each device and its neighbors. Within the integrating chamber are mounted a plurality of auxiliary light sources, one for each light-sensitive device and each positioned with respect to its corresponding light-sensitive device in light transmitting and receiving relationship. Also included, is an amplifier having an input circuit connected to be supplied from all the light-sensitive devices and an output circuit which is adapted to be connected either to an appropriate control device such as an electromagnetic relay. A plurality of switches is provided for individually energizing the auxiliary light sources and a plurality of gain control devices, one for each of the light-sensitive devices, are also provided. The gains of the light-sensitive devices are equalized by energizing each auxiliary light source in turn and adjusting the gain control for the corresponding light-sensitive device until the gain for each as indicated on an electrical indicating instrument is the same as the gain for all others.

For a better and more complete understanding of the invention, reference should now be had to the following specification and to the accompanying drawings of which Fig. 1 is a diagrammatical sketch of a pinhole detector installation, Fig. 2 is a diagrammatic view in perspective of the main light source and detecting unit of a pinhole detector installation, Fig. 3 is a view in front elevation partly in section of the detecting unit, Fig. 4 is a sectional view taken on the line of 4—4 of Fig. 3 and Fig. 5 is an elementary diagram of the circuits and electrical components of a pinhole detector installation.

Referring now to the drawing and particularly to Fig. 1 thereof, a pinhole detecting equipment is illustrated as comprising a main light source 1 and a detecting unit 2 spaced apart to permit the passage between them of the material to be inspected. The material undergoing inspection is illustrated as a continuous length 3 of a metal such for example as tinplate. A slot 2a extending over a major portion of the length of the upper wall or face of the detecting unit enclosure permits light transmitted from the main light source through pinholes in the material to enter the detecting unit. The passline of the material undergoing inspection is defined and stabilized by suitable means which are illustrated as pinch rolls 4 on the entry side of the equipment and a similar pair of pinch rolls 5 on the delivery side. Suitable light shielding is provided to exclude as much as possible of the ambient light from the interior of the detector unit. In this connection a light shield 6 is provided. It may be of any suitable opaque material having a matte or even a rough surface of relatively low reflectivity to provide for absorption of light striking the shield. The shield is attached to the detecting unit in the manner illustrated in Fig. 1 in order to minimize the amount of light reflected into the unit from the underside of the material undergoing inspection. Preferably the shield is extended in both directions from the detecting unit as closely as possible to the pinch rolls.

The main light source comprises a suitable high intensity lamp, such for as example as UA-9 mercury lamp. A lamp having a rating of 3,000 watts is adequate for this application.

The detecting unit comprises a sealed, dust-tight tubular box 8. It may be made of any suitable opaque material such as sheet steel and may be fabricated to have either a circular cross-section or a generally square cross section with its upper corners flattened to provide suitable supporting surfaces for mounting the light-sensitive devices of the detector. In the longitudinal slot 2a in the upper face of the tubular box is mounted a panel 9 which is preferably made of glass but which may be made of any other suitable transparent material. Light transmitted from the main light source through pinholes in the material 3 passes through the glass panel into the interior of the tubular box 8.

The interior surface of the tubular box 8 is coated with a highly reflective white paint which has a matte finish thereby to provide a light integrating chamber. This highly reflective coating diffuses the light fairly evenly so that light transmitted through a pinhole and entering the integrating chamber is diffused throughout a substantial portion of the chamber.

Near the top of the integrating chamber and on either side of the longitudinal light admitting slot 2a is mounted a plurality of light-sensitive devices aligned in a longitudinal row and spaced apart from each other by substantial intervals. For a detector for inspecting 48" width material, a total of 6 light-sensitive devices 10, 11, 12, 13, 14 and 15, three on either side of the slot 2a provide adequate coverage. In Fig. 3 are shown light-sensitive devices 10 and 12 of the longitudinal row disposed on one side of the slot. They are substantially equally spaced apart in the row. Similarly the light sensitive devices in the row on the opposite side of the slot are equally spaced apart and are in staggered relationship in respect to the tubes in the row on the other side of the slot.

Although these light-sensitive devices may be of any suitable type, they are preferably 931A photo multiplier tubes. The light output of the mercury tube lamp is blue and the 931A photomultiplier tubes have good sensitivity to the blue region of the spectrum. Owing to this good color match, the mercury tube is more suitable than a filament type lamp for use with the 931A multiplier tubes. As shown in Fig. 5, the photomultiplier tube 10 which is identical with all the others, comprises an evacuated sealed glass envelope within which is mounted a photo emissive cathode 10a, 9 dynodes and a collector or anode 10b. These photomultiplier tubes are mounted on the sloping portions of the wall of the integrating chamber in such position that they look directly downwardly at the bottom of the chamber; that is to say they present the photo-emissive surfaces of their cathodes to the bottom of the chamber so as to intercept light reflected therefrom.

Also mounted in the integrating chamber are a plurality of auxiliary light sources 16, 17, 18, 19, 20 and 21, one for each photo tube and each associated with its corresponding photo tube so that the auxiliary source and its corresponding photo tube are in light transmitting and receiving relationship. These auxiliary light sources are mounted in light-shielding tubes at the bottom of the integrating chamber so that the light from each is directed to the photo cathode surface of its corresponding photo tube and is prevented from reaching the cathodes of other photo tubes in any substantial degree. In Figs. 3 and 4 are shown the light shielding tubes 22 and 23 for the auxiliary light sources 16 and 18 which are associated with the photo tubes 10 and 12 respectively.

These auxiliary light sources may be of any suitable type; for example they may be relatively weak incandescent lamps or they may be relatively weak glow discharge devices such for example as neon tubes. Whichever type is chosen, the ratings are such that the current produced by a photo tube in response to the energization of its corresponding auxiliary light source approximates the current that would be produced in response to light received from the main light source through a hole of the minimum size which it is desired to detect in the material undergoing inspection. The auxiliary light sources 16 to 21 inclusive are illustrated as neon tube glow discharge devices.

For separately energizing the auxiliary light sources 16 to 21 inclusive, a plurality of switches 24, 25, 26, 27, 28 and 29 are provided. These are preferably manually operated push button type switches having a pair of normally closed contacts which short circuit the auxiliary light source and a pair of normally open contacts in series with such auxiliary light source. When the normally open contacts of one of the switches are closed, the associated auxiliary light source is connected to a suitable source of supply voltage such as the secondary winding 30b of a supply transformer 30 of which the primary winding 30a is supplied from a suitable commercial source of alternating voltage supply which is represented by the terminals 31. Alternatively, the auxiliary light sources may be supplied from a source of direct voltage such as that from which the amplifier is supplied.

To the dynodes of the photomultiplier tubes, voltages of the appropriate magnitude are supplied from suitable individual voltage dividers 32, 33, 34, 35, 36 and 37 which are supplied from a suitable source of direct voltage such as the output terminals 38a and 28b of the pi filter 38 which is supplied through a rectifier 38c from the secondary winding of an auxiliary transformer of which the primary winding is supplied from the secondary winding of supply transformer 30. The rectifier 38c is preferably a selenium rectifier. An individual resistor is connected in series in the leg of each dynode. The purpose of these individual resistors is to limit the current through the photomultiplier tube to a safe value to prevent damage to the tube by the intense light from the mercury arc lamp main light source when the material is not in place to be scanned. For separately adjusting the gain of the photomultiplier tubes, a plurality of gain control potentiometers 39, 40, 41, 42, 43 and 44, one for each photo tube are provided. Each is connected between the source of voltage supply and the voltage divider for the photo tube with which it is operatively associated. The gain of each photo tube is readily adjusted by adjusting the slider of its associated gain control potentiometer to adjust the high voltage supplied to the dynodes.

The output currents of all the photo tubes 10 to 15 inclusive pass through the common anode resistor 45. Whenever light is received on the cathode of one of the photo multiplier tubes through a pinhole or from the associated auxiliary light source, a signal voltage is produced across the resistor 45 which is capacitatively coupled to the input of a three-stage amplifier of which electric valves 46, 47 and 48 constitute the first, second and third stages respectively. For the purpose of adjusting the gain of the amplifier there is provided a gain control potentiometer 49 to the slider 49a of which is connected the control electrode of the first stage valve 46. Adjustment of the slider 49a adjusts the bias of the valve. The biases supplied to all three, first, second and third stage valves are such that when the photo tubes are dark, i.e. when no light is passing through a pinhole to a photo tube or is being received from its corresponding auxiliary light source, the first, second and third stage valves are conducting. A pinhole results in a voltage pulse across the resistor 45 of which the polarity is negative at the terminal which is connected to the control electrode of the first stage valve and this produces a positive voltage pulse at the output terminal, i.e. at the anode terminal of the third stage valve 48. Preferably, the slider 49a is adjusted to a position such that a slightly positive bias is applied to the control electrode of the first stage valve to render it fully conducting when the photo tubes are dark. The advantage of this is that relatively small negative voltage pulses resulting from slight electrical "noise" are insufficient to cause valve 46 to change from its fully conducting state. Light from the main light source passing through a pinhole causes the photo tubes to produce a signal voltage of sufficient magnitude to overcome this small positive bias and thereby cause the first stage valve 46 to become less than fully conducting. In this manner, small and inconsequential signal voltages are ignored but larger signal voltages such as produced by light passing through pinholes are amplified. A jack 45a is connected in series with the common anode resistor 45 to provide for connection of a suitable electrical indicating instrument to provide a reading of the photo tube D.-C. output current.

Secured to a main supporting frame 50, which is preferably fabricated of angle irons, are mounting brackets 51 upon which the tubular box integrating chamber 8 is hung by means of suitable rubber shock mounts 51a. In Fig. 3 only one mounting bracket at the left hand end of the integrating chamber is shown. It will be understood, however, that a similar mounting bracket is provided for supporting the other end of the tubular box 8. Also hung from the left hand mounting bracket 51 by means of rubber shock mounts 51b is an amplifier panel 52 upon which are mounted the amplifier valves 46, 47 and 48 and their associated control components. A separate subassembly comprising an end panel 53 is secured to the mounting frame by suitable fastening means such as bolts. The amplifier panel 52 and the end panel 53 occupy vertical planes which are perpendicular to each other. Upon the end panel 53 are mounted the gain control potentiometers 39–44 inclusive, the amplifier gain control potentiometer 49, the test jack 45a and individual push button test switches 24–29 inclusive.

Gain control potentiometers 39 to 44 inclusive are mounted on the inner surface of the panel 53 with their rotatable shafts extending through to the exterior or front side of the panel to provide for mounting adjustment knobs 39a, 40a, 41a, 42a, 43a and 44a on the end of the shaft. Similarly, the push button switches 24, 25, 26, 27, 28 and 29 are mounted on the interior surface of the panel so that the push button actuators extend through to the front side.

The output of the three-stage amplifier which is taken at the anode of the third stage valve 48 is supplied to the input control electrode of an electric valve 54 which, together with an electric valve 55 and associated control components, constitutes a single pulse multivibrator. Normally, i.e. when no light reaches a photo tube either through a pinhole or from its associated auxiliary light source, the valve 55 is conducting and the valve 54 is non-conducting. In response to the positive voltage pulse at the output of the amplifier produced by light received from a photo tube, the valve 54 becomes conducting and the valve 55 becomes non-conducting for an interval of time dependent upon the time constant of the capacitor 56 and the resistor 57. At the end of such time interval, the valve 55 again becomes conducting and the valve 54 becomes non-conducting. The resultant voltage pulse at the anode of the valve 55 has a square wave form.

The output of the multivibrator which is taken at the anode of the valve 55 is supplied through capacitative coupling to the control electrode of a triode electric valve 58 which, together with a resistor 59 in its cathode circuit and other associated control components, constitutes a cathode follower which provides impedance matching and isolation. Across the series combination of cathode resistor 59 and potentiometer 60 is connected a capacitor 61 which is charged in response to the positive pulse at the output terminal of the multivibrator. The polarity of the charge produced on the capacitor 61 is positive at the terminal which is connected to the cathode of valve 58. After the charging step is completed, the capacitor 61 discharges through the cathode circuit resistor 59 and potentiometer 60 at a rate which is determined by the setting of the potentiometer slider 60a.

For the purpose of effecting operation of a relay 62 in response to the charge on the capacitor 61, a twin triode electric valve 63 is provided. The two separate halves of the twin triode are connected as a two-stage cathode-coupled amplifier of which the input of the first stage is connected across the capacitor 61. In the anode circuit of the second stage is connected the operating coil of the relay 62. Normally, i.e. when no light is received on the cathode of a photo tube either through a pinhole or from its associated auxiliary light source, the capacitor 61 is discharged, the first stage of the amplifier 63 is non-conducting and the second stage is conducting. Consequently, the relay 62 is energized and picked up. Light passing through a pinhole in the material undergoing inspection or from one of the auxiliary light sources of one of the photo tubes in the detecting unit causes the cathode follower to charge the capacitor 61. In response to the voltage produced on the capacitor, the first stage of amplifier 63 becomes conducting and the second stage becomes non-conducting. As a result, the relay 62 is deenergized and dropped out. After an interval of time determined by the time constant of capacitor 61 and the resistors 59 and 60, the capacitor is discharged and the first stage valve of amplifier 63 again becomes non-conducting and the second stage valve becomes conducting to reenergize and pick up the relay 62.

The dropout of the relay may be utilized to initiate the operation of a marking device, diverter gate or other control device.

An advantage of using the cathode follower and its associated capacitor 61 as a voltage storage device with a variable time constant is that it permits the circuit to be designed to include a multivibrator with rapid reset. This results in rapidly returning the detector to a reset condition after each actuation by a pinhole to "look" for closely following pinholes. Thus, during the timing operation initiated by a first pinhole, the detector is not rendered inactive but will respond to a second pinhole following the first within two milliseconds to effect a repeat operation of the multivibrator, recharge the cathode follower capacitor 61 and maintain the relay 62 in its dropped out position as it should be for a second pinhole.

Equalization of the gains of the six photo tubes 10, 11, 12, 13, 14 and 15 in the detecting unit is accomplished in the following manner. The light admitting slot 2a of the detecting unit is masked to exclude all light. In addition, the main light source, i.e. the mercury lamp 1 is disconnected from its source of supply. The entrance of all other light into the integrating chamber is prevented by carefully masking all openings through which light might enter with a black tape and a metal or other opaque strip.

A suitable indicating instrument such as an electronic voltmeter with a 1 megohm resistor is plugged in the jack 45a on the panel at the end of the detecting unit. The voltmeter should indicate a very low reading (.05 to .1 volt).

Following this individual photo tube gain control potentiometers on the panel at the end of the detecting unit are turned to their extreme positions for maximum gain. Each of the test push buttons 24, 25, 26, 27, 28 and 29 is depressed in turn, and the voltmeter reading resulting from each depression of a push button recorded. As explained in the foregoing, depression of one of the push button switches energizes the associated auxiliary light source and this causes to be directed on to the photo cathode of the associated photo tube an amount of light which is substantially equivalent to that received from the main light source through a 1 mil hole in the material undergoing inspection. The voltmeter readings obtained as a result of the successive depressions of the six push button switches 24 to 29 inclusive indicate the approximate relative sensitivities of the photo tubes 10 to 15 inclusive. It is desirable to set the gain of the photo tubes as high as possible, and therefore the gain of the photo tube having the lowest reading is left at the maximum gain position. The gain of each of the other photo tubes is similarly adjusted by pushing the associated push button switch and adjusting the corresponding gain control potentiometer to give a voltage reading equal to that of the lowest gain photo tube. When this has been completed, the gains of all photo tubes will have been equalized.

At any time during the operation of the equipment to detect pinholes in a length of material, the operator may check each of the individual photo tube circuits while the equipment is in operation without the necessity of shutting down the line on which it is installed. This is accomplished merely by depressing each of the manually operated push button switches 24, 25, 26, 27, 28 and 29 in turn. If each depression of one of these push buttons results in dropping out the relay 62, each of the photo tube circuits and the associated control circuits is operative.

Although in accordance with the provisions of the patent statutes, this invention is described as embodied in concrete form and the pinciple of operation as explained together with the best mode in which it is now contemplated applying that principle with be understood that the matter shown and described is merely illustrative, and that the invention is not limited thereto since alterations and modifications will readily suggest themeselves to persons skilled in the art without departing from the true spirit of this invention or from the scope of the annexed claims.

What I claim as new and desire to secure by Letters Patent of the United States is:

1. A photoelectric pinhole detecting unit comprising an enclosed housing member formed by walls, one of said walls having an elongated slot therein for admitting light to the interior of said housing and said walls having their inner surface coated with a reflective material to provide a light integrating chamber, and a light sensitive device positioned within said chamber and mounted on said one wall, said light sensitive device being located near one edge of said slot but out of the path of light passing through said slot, said light sensitive device being oriented to respond substantially only to light that passes through said slot and that is reflected by said inner surface.

2. A photoelectric pinhole detecting unit comprising an enclosed housing member formed by walls, one of said walls having an elongated slot therein for admitting light to the interior of said housing and said walls having their inner surface coated with a reflective material to provide a light integrating chamber, a first light sensitive device positioned within said chamber and mounted on said one wall, said first light sensitive device being located near one edge of said slot but out of the path of light passing through said slot, and a second light sensitive device positioned within said chamber and mounted on said one wall, said second light sensitive device being located near an opposite edge of said slot but out of the path of light passing through said slot, said light sensitive devices being oriented to respond substantially only to light that passes through said slot and that is reflected by said inner surface.

3. A photoelectric pinhole detecting unit comprising an elongated tubular housing member having a longitudinal slot disposed generally parallel to the longitudinal axis of said housing member for admitting light to the interior thereof and having its inner surface coated with a highly reflective material to provide a light integrating chamber, a plurality of light-sensitive devices disposed within said chamber and adjacent to but out of the path of light passing through said slot on one side of said slot in longitudinal spaced apart relationship, and a second plurality of light-sensitive members disposed within said chamber adjacent to but out of the path of light passing through said slot on the opposite side of said slot in longitudinal spaced apart relationship, said pluralities of light sensitive members mounted on said housing member to respond substantially only to light transmitted through said slot and diffused by said coated surface.

4. A photoelectric pinhole detecting unit comprising a tubular housing member provided with a longitudinally disposed slot for admitting light to the interior thereof and having its inner surface coated with a highly reflective material to provide a light integrating chamber, a plurality of light-sensitive devices disposed within said chamber and mounted on said housing member in longitudinally spaced apart relationship to respond substantially only to light transmitted through said slot and diffused by said coated surface, a plurality of auxiliary light sources disposed within said chamber one for each of said light-sensitive devices, and means mounting each of said auxiliary light sources on said housing member in light transmitting and receiving relationship between it and its corresponding light-sensitive device.

5. A photoelectric pinhole detecting unit comprising a tubular housing member provided with a longitudinally disposed slot for admitting light to the interior thereof and having its inner surface coated with a highly reflective material to provide a light integrating chamber, a plurality of light-sensitive devices disposed within said chamber and mounted on said housing member in longitudinally spaced apart relationship to respond substantially only to light transmitted through said slot and diffused by said coated surface, a plurality of auxiliary light sources disposed within said chamber one for each of said light-sensitive devices, and shielding means for each of said light sources for substantially preventing transmission of light from each to the light-sensitive devices associated with the other light sources.

6. A photoelectric detecting unit comprising a tubular housing member provided with a longitudinally disposed slot for admitting light to the interior thereof and having its inner surface coated with a highly reflective material to provide a light integrating chamber, a plurality of light-sensitive devices disposed within said chamber and mounted on said housing member in proximity to said slot to respond to light transmitted through said slot and diffused by said coated surface, a plurality of auxiliary light sources, one for each of said light-sensitive devices, disposed within said chamber and each positioned to transmit light to its corresponding light-sensitive device, a control device, an amplifier having an input circuit electrically connected to all said light-sensitive devices and an output circuit electrically connected to said control device, voltage supply terminals for said auxiliary light sources, a plurality of switching devices, one for each of said auxiliary sources for individually connecting said auxiliary sources to said voltage supply terminals to effect operation of said control device in response to the light received by one of said light-sensitive devices from an energized one of said light sources.

7. A photoelectric detecting unit comprising an elongated tubular housing member having a longitudinal slot disposed generally parallel to the longitudinal axis of said housing member for admitting light to the interior thereof and having its inner surfaces coated with a highly reflective material to provide a light integrating chamber, a plurality of light-sensitive devices disposed within said chamber and mounted on said housing member in longitudinal spaced apart relationship, a plurality of gain control devices, one for each of said light-sensitive devices, an amplifier mounted at one end of said housing member and having an input circuit connected to be supplied from all said light-sensitive devices, terminals providing for the connection in said input circuit of an electrical indicating instrument, a plurality of auxiliary light sources mounted within said housing member and each disposed to transmit light to a corresponding one of said light-sensitive devices, voltage supply terminals for said auxiliary light sources, and a plurality of switching devices for separately connecting each of said light sources for individual energization to produce a voltage at said input circuit terminals in response to the light transmitted from an energized light source to its corresponding light-sensitive device.

8. A photoelectric detecting unit comprising a tubular housing member having a longitudinal slot disposed generally parallel to the longitudinal axis of said housing member for admitting light to the interior thereof and having its inner surface coated with a highly reflective material to provide a light integrating chamber, a pair of voltage supply terminals, a plurality of light-sensitive devices disposed within said chamber and mounted on said housing member in spaced apart relationship and electrically connected to be supplied from said supply terminals, an amplifier having an input circuit connected to be supplied from all said light-sensitive devices and having terminals for connection to an electrical indicating instrument, and means for equalizing the gains of all said light-sensitive devices comprising a plurality of gain control potentiometers one for each of said light-sensitive devices, a plurality of glow discharge devices, each mounted within said chamber in position to transmit light to a corresponding one of said light-sensitive devices, a pair of voltage supply terminals for said glow discharge devices and a plurality of switching devices, one for each of said glow discharge devices, for separately connecting each of said discharge devices to said supply terminals for individual energization to produce a voltage at said instrument connection terminals in response to the light transmitted from an energized glow discharge device to its corresponding light-sensitive device.

9. A photoelectric detection unit comprising an elongated tubular housing member having a longitudinal slot disposed generally parallel to the longitudinal axis of said housing member for admitting light to the interior thereof and having its inner surface coated with a highly reflective material to provide a light integrating chamber, a plurality of light-sensitive devices disposed within said chamber and mounted on said housing member in longitudinal spaced apart relationship, a supporting member mounted at one end of said housing member, an electrical control device, an amplifier mounted on said supporting member and having an input circuit connected to be supplied from all said light-sensitive devices and having an output circuit connected to supply said control device, a plurality of auxiliary light sources each mounted within said chamber in position to transmit light to a corresponding one of said light-sensitive devices, a pair of voltage supply terminals, a plurality of switching devices mounted on said supporting member, one for each of said auxiliary light sources for separately connecting each of said auxiliary sources to said supply terminals for individual energization, a plurality of individual gain control potentiometers, one for each of said light-sensitive devices and each mounted on said mounting member in positional proximity to the switching device for the auxiliary light source corresponding to its associated light-sensitive device.

References Cited in the file of this patent

UNITED STATES PATENTS

| | | |
|---|---|---|
| 1,897,219 | Schroter | Feb. 14, 1933 |
| 2,193,590 | Gulliksen | Mar. 12, 1940 |
| 2,229,451 | Gulliksen | Jan. 21, 1941 |
| 2,229,638 | Chamberlin et al. | Jan. 28, 1941 |
| 2,371,963 | La Pierre | Mar. 30, 1945 |
| 2,444,442 | Herbold | July 6, 1948 |
| 2,563,274 | Rendel | Aug. 7, 1951 |
| 2,627,064 | Allen | Jan. 27, 1953 |
| 2,753,464 | Stone | July 3, 1956 |
| 2,758,712 | Linderman | Aug. 14, 1956 |